D. W. JONES.
STEERING GEAR.
APPLICATION FILED JUNE 24, 1920.
1,365,326.
Patented Jan. 11, 1921.
2 SHEETS—SHEET 2.
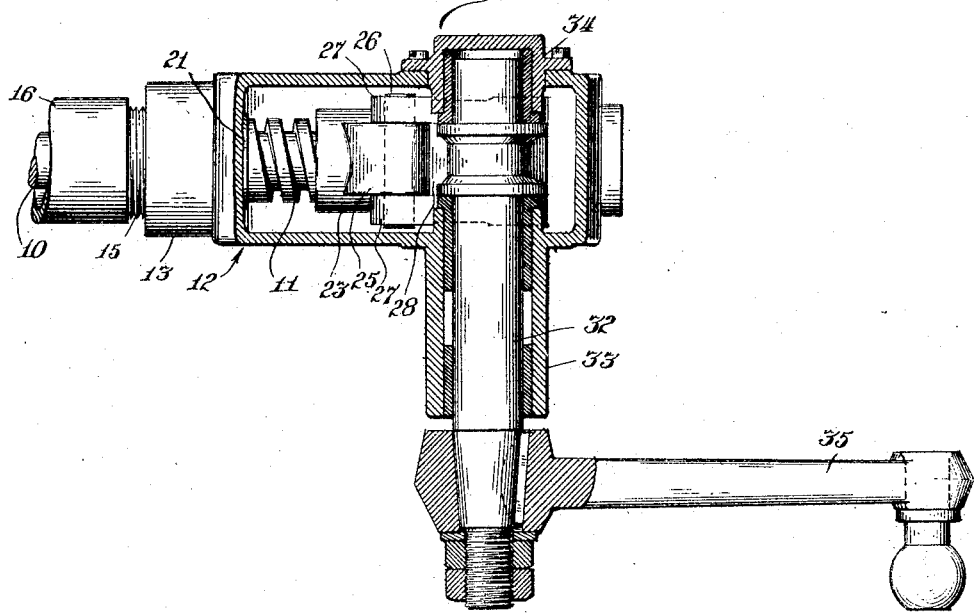
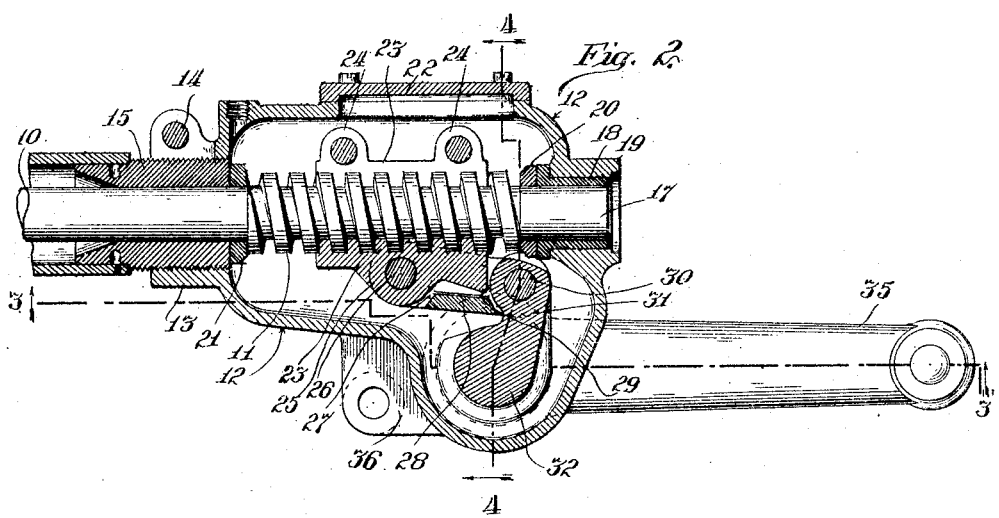

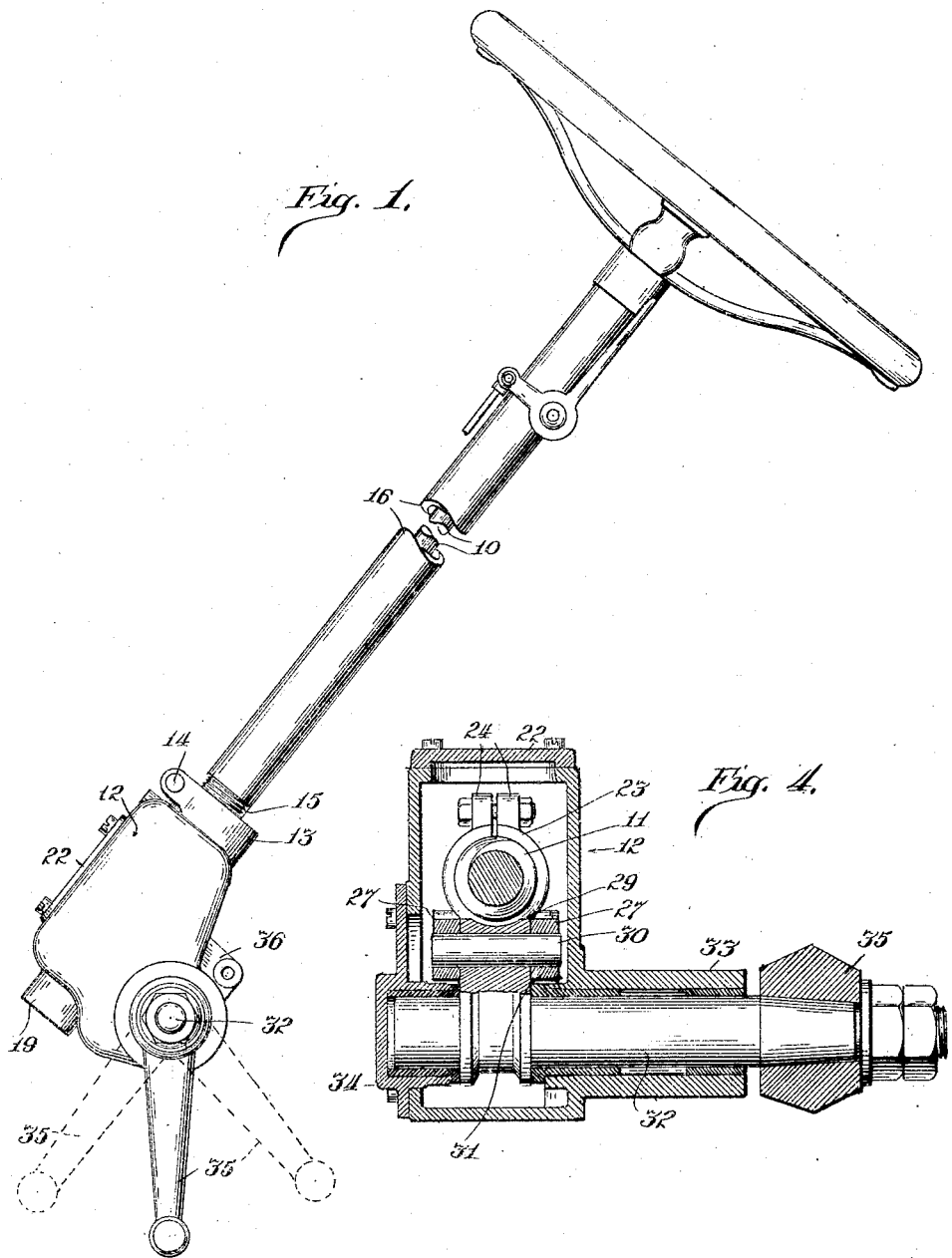

UNITED STATES PATENT OFFICE.

DAVID W. JONES, OF CHICAGO, ILLINOIS.

STEERING-GEAR.

1,365,326.   Specification of Letters Patent.   Patented Jan. 11, 1921.

Application filed June 24, 1920. Serial No. 391,432.

*To all whom it may concern:*

Be it known that I, DAVID W. JONES, a citizen of the United States, and a resident of Chicago, in the county of Cook and State of Illinois, have invented a certain new and useful Improvement in Steering-Gears, of which the following is a description, reference being had to the accompanying drawings, which form a part of my specification.

My invention relates to steering gears of the worm and traveling nut type for use on motor-driven vehicles and has for its object the provision of a simple construction comprising a single piece outer case and with a single piece nut formed to provide suitable guide surfaces adapted to extend between the side portions of a link which latter is so formed as to constitute a guide for the nut and prevent turning or rotation of the nut; the nut and link being of such construction that they may be readily dropped into the case through a suitable opening in the case and be positioned to receive the worm-shaft and the rocker-arm secured to the rocker-shaft; the purpose of my invention being to provide a construction possessing few parts and having the requisite strength and which may be easily manipulated and will be smooth in action, while at the same time possessing great wearing quality.

The objects and advantages of my invention will be more readily comprehended from the detailed description of the accompanying drawings, wherein:—

Figure 1 illustrates in side elevation my improved steering gear applied at the lower end of the steering post, portions of the latter being broken away.

Fig. 2 is a longitudinal central sectional view of my improved steering gear.

Fig. 3 is a view taken on the line 3—3 of Fig. 2, looking in the direction of the arrows.

Fig. 4 is a cross sectional view taken on the line 4—4 of Fig. 2 looking in the direction of the arrows.

My invention relates to the steering gear proper, that is to say to the mechanism whereby rotation of the steering column or shaft will transmit movement to the steering wheels of the vehicle by means of the usual connecting rod or link; and as the invention relates to the steering gear proper a specific description of the construction and mounting of the steering column and other portions of said mechanism will not be entered into.

The invention as disclosed in Fig. 1 is shown secured at the lower end of the steering column which comprises the steering shaft 10, the lower end whereof has operative connection or is formed integral with the worm portion 11. The lower end of the steering shaft is rotatably mounted in a single piece casing or housing 12 provided with a boss-portion 13 at the upper end which is preferably slightly split and adapted to be drawn together by a suitable bolt 14 passing through the apertured lobes or ears formed by the slit in the boss-formation 13. This boss-formation 13 is internally threaded to receive the externally threaded bushing or sleeve 15 through which the steering post extends. The sleeve or bushing is slightly reduced at its outer end to receive the lower end of the outer shell 16 of the steering column. It is evident that when the nut on the end of bolt 14 is turned in tightening direction, the split portion of the boss 13 will be drawn into firmer relation with the bushing or sleeve 15 and thus prevent any possible or accidental unscrewing of the sleeve or bushing.

The lower end of the worm 11 terminates in the plain surfaced cylindrical portion 17 which extends into a bushing 18 preferably flanged at one end and adapted to be inserted into the apertured boss 19 of the casing or housing 12 at the lower end thereof; the worm-shaft 11 being also provided with a suitable washer 20 adapted to receive the end thrust of the worm; while the upper end of the worm-shaft 11 is also provided with a suitable washer 21, so that movement of the worm-shaft lengthwise of the casing 12 will be prevented. One side of the casing or housing 12 is provided with an opening which is closed by a suitable cover or lid 22 removably bolted into place as shown in Figs. 1 and 2; the opening being of such dimensions as to permit the withdrawal of a single piece sleeve or nut 23, (threaded on the worm-shaft 11) when the worm-shaft has been screwed out of the nut. The withdrawal of the worm-shaft from the nut 23 may be accomplished by releasing the bolt 14 on the split boss 13 of the casing so as to permit unscrewing of sleeve or bushing 15, and therefore permit the withdrawal of the worm-shaft through the upper end of the casing or housing 12.

The single piece nut 23 is shown in the nature of a split sleeve internally threaded to mesh with the worm 11 of the shaft, to adapt the nut to travel lengthwise of the shaft when the worm 11 is rotated. One side of the sleeve or nut is provided with two pairs of lobes 24, 24 apertured to receive screw bolts; the lobes being formed integral with the sleeve adjacent the slit therein, so that when the bolts are firmly screwed into place, the nut will be drawn into firm relation with the worm-shaft and thereby enable any wear that may occur to be taken between the shaft and the nut.

The opposite longitudinal side of the sleeve or nut 23 and preferably at a point intermediate of the ends thereof is provided with a boss-formation 25 apertured to receive a suitable connecting pin or trunnion 26 whereby a link 27 is pivotally secured to the sleeve or nut 23. The link 27 is preferably of double construction so as to have a link portion or member disposed on opposite sides of the boss 25 of the nut. The two sides or portions of the link are integrally connected together by a web 28 disposed therebetween at a point intermediate of the ends and preferably formed integral with one of the longitudinal sides of each link portion or member so as to permit the latter to straddle a guide portion or lug 29 formed on the nut 23, and at the same time permit the lower ends of the double link 27 to be pivotally connected by a suitable pin 30 to the rocker-arm 31, which I prefer to form integral with the rocker-shaft 32. With the sleeve or nut 23 provided with the integral lug 29, it is apparent that lateral movement of the nut relative to the link 27 will be prevented and a smooth riding or travel of the nut insured.

The rocker-shaft 32 is rotatably mounted in a hub 33 formed integral with one side of the casing or housing 12, see Figs. 3 and 4, while the end beyond or to the opposite side of the rocker-arm 31 is mounted in a hub portion of a removable plate or bushing member 34; the plate or member 34 being secured in place by suitable screw-bolts, or in any other convenient manner, with the hub-portion of the plate 34 disposed into a suitable opening formed in the adjacent side wall of the casing or housing 12. The opening in the side wall of the casing 12, which is closed by the plate 34, is such as to permit the passage of rocker-arm 31 with rocker-shaft 32 for the purpose of assembling the elements; after which the steering arm 35 is secured to the outer extended end of the rocker-shaft 32. It is evident from the construction shown and described, that the various elements of the steering gear may not only be readily put into place, namely the rocker-shaft and rocker-arm through the opening in the side wall closed by plate 34 and the link and sleeve or nut through opening closed by plate 22; but that said elements may be easily withdrawn from the casing or housing for the purpose of repair and the like. The end of the rocker-shaft 32, disposed through the hub-portion 33 of the casing or housing 12, is adapted to be provided with the steering arm 35; the various positionings whereof, through actuation of the worm-shaft and correlated elements, is indicated in dotted lines in Fig. 1.

The lower side of the casing or housing 12 is shown provided with an integral boss 36 apertured transversely to permit the casing or housing to be suitably bolted or otherwise secured to a supporting frame or bracket on the vehicle.

With the elongated nut or sleeve 23 provided with the integral enlargement or guide portion 29, adjacent the lower end thereof and on the link side of the nut, it is evident that the nut will be held against rotation because said enlargement or guide portion 29 extends intermediate of the parallelly disposed side portions or members of the link 27; while the link, when secured in place by the connecting pin 26, will be in close relation with the side walls of the casing or housing 12 and therefore prevent any possible turning of the nut and link; the link, in turn, forming a suitable guide for the nut in its travel lengthwise of the casing or housing 12 along the worm 11.

It is evident from the construction shown that rotation in one direction of shaft 10 and therefore of the worm portion 11 will cause the nut or sleeve 23 to travel downwardly on the worm, inducing link 27 to oscillate rocker-arm 31 toward the lower end of the casing or housing 12 and therefore rotate rocker-shaft 32. Such rotation of rocker-shaft 32 will cause arm 35 to oscillate toward the right in Fig. 1, as shown in dotted lines; while the reverse rotation of the shaft 10 will induce nut or sleeve 23 to travel upwardly, thereby forcing rocker-arm 31 in a direction which will cause arm 35 to oscillate to the left in Fig. 1 into the position shown in dotted lines.

The single piece casing, nut or sleeve and link formation provide an efficient, rigid and strong steering gear, which may be readily assembled, being composed of few elements.

I have shown and described what I believe to be the simplest and best embodiment of my invention, but certain modifications may be made without, however, departing from the spirit of my invention.

What I claim is:—

1. A steering gear, comprising a one piece casing provided with an opening in the top side wall thereof, closure means for said opening, a worm-shaft rotatably mounted in opposite ends of the casing, a one piece sleeve threaded on said shaft and provided with a shoulder or boss disposed lengthwise of one side thereof, a double link adapted to straddle the boss or shoulder on said sleeve and pivotally secured to the upper end of said boss, and an integral rocker-shaft and rocker-arm mounted in the lower part of said casing, the rocker-arm being pivotally secured between the side portions of the double link.

2. A steering gear, comprising a one piece casing, a worm-shaft rotatably mounted in opposite ends of the casing, a one piece sleeve threaded on said shaft and provided with a boss on one side thereof, a double link pivotally secured to the boss and adapted to straddle the same, and an integral rocker-shaft and rocker-arm mounted transversely in the lower part of the casing with the rocker-arm pivotally secured to said lower end of said double link so as to prevent rotation of the link and said sleeve.

3. A steering gear, comprising a one piece casing provided with a hub-formation integral with one side thereof adjacent the lower end, the ends of the casing being provided with apertured bosses, with the boss at one end being split to permit contraction, a worm-shaft disposed lengthwise of the casing and rotatably mounted in the bosses at both ends of the casing, a one piece sleeve threaded on the shaft and provided with a boss disposed lengthwise of one side of the sleeve, a link member pivotally secured to said sleeve and disposed on opposite sides of the boss to prevent rotation of the sleeve, and an integral rocker-arm and rocker-shaft, the rocker-arm being pivotally secured to the lower end of said link, while the rocker-shaft is disposed through the hub-formation of the casing.

4. In a device of the character described, a one piece casing provided at opposite ends with apertured bosses, one of which is made contractible, a hub-formation formed integral with one side of the casing adjacent one end thereof, the casing wall opposite to said hub-formation being provided with an opening through which the rocker-arm and rocker-shaft are inserted, while the wall adjoining the side having the rocker-arm receiving opening and the side having the hub-formation is provided with a sleeve and link-introducing opening.

5. In a steering gear, a one piece casing contractible at one end, a bushing threaded in said end, a worm-shaft rotatable in said casing and disposed through said bushing, a one piece sleeve threaded on said shaft, said sleeve being contractible about the shaft and provided with a boss disposed lengthwise of the sleeve, and a sleeve and link-inserting opening in one wall of said casing intermediate of the end of the casing.

6. In a steering gear, a one piece casing provided with bosses at opposite ends thereof, one of said bosses being internally threaded and split so as to be contractible, a side wall of the casing being provided with an opening intermediate of the ends, a closure member for said opening, a worm shaft, the ends whereof are rotatably mounted in said bosses, a second side wall of the casing being provided with an integral hub portion, an opening in the third side wall of the casing opposite to said hub-portion, a rocker shaft rotatably mounted in the hub and disposed into the opening in the opposite side wall, a rocker arm formed integral with said rocker shaft, a one piece split sleeve threaded on said worm shaft, the sleeve being provided with an enlargment or boss on one side thereof, and a double link pivotally secured to one end of said boss on the sleeve and adapted to straddle the same to prevent rotative movement of the sleeve relative to said link, said link being provided with an integral web adapted to extend across said enlargement or boss on the sleeve, the opposite end of said link being pivotally secured to said rocker arm.

7. In a steering gear, a one piece casing, a worm shaft rotatable in said casing, a one piece sleeve threaded on said shaft and adapted to be drawn into close contact with said shaft, one side of said sleeve being provided with an enlargement or boss-formation extending toward one end thereof, and a link comprising side members pivotally secured at one end to the enlargement or boss-formation on the sleeve, said side members of the link being connected by an integral web adapted to fit over the enlargement or boss-formation on the sleeve so that rotative movement of the sleeve relative to said link will be prevented.

DAVID W. JONES.

Witnesses:
G. HEIDMAN,
F. A. FLORELL.